US010365980B1

United States Patent
Bromling et al.

(10) Patent No.: US 10,365,980 B1
(45) Date of Patent: Jul. 30, 2019

(54) STORAGE SYSTEM WITH SELECTABLE CACHED AND CACHELESS MODES OF OPERATION FOR DISTRIBUTED STORAGE VIRTUALIZATION

(71) Applicant: EMC IP Holding Company LLC, Hopkinton, MA (US)

(72) Inventors: Steven Bromling, Edmonton (CA); Joshua Baergen, Edmonton (CA); Paul A. Shelley, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 15/798,632

(22) Filed: Oct. 31, 2017

(51) Int. Cl.
*G06F 11/16* (2006.01)
*G06F 16/178* (2019.01)
(Continued)

(52) U.S. Cl.
CPC ...... *G06F 11/1658* (2013.01); *G06F 11/2089* (2013.01); *G06F 16/178* (2019.01);
(Continued)

(58) Field of Classification Search
CPC .. G06F 16/27; G06F 16/178; G06F 16/24552; G06F 11/1471; G06F 11/2071;
(Continued)

(56) References Cited

U.S. PATENT DOCUMENTS 5,752,264 A * 5/1998 Blake ................. G06F 12/0811
711/122
7,945,640 B1 * 5/2011 VanTine ................ G06F 3/0605
709/217
(Continued)

OTHER PUBLICATIONS

Dell EMC, "VPLEX Ensures Uptime for Business Critical Applications—VPLEX Delivers Continuous Data Availability and Data Mobility," Data Sheet, 2017, 4 pages.
(Continued)

*Primary Examiner* — Alina A Boutah
(74) *Attorney, Agent, or Firm* — Ryan, Mason & Lewis, LLP

(57) ABSTRACT

An apparatus in one embodiment comprises a storage system including a plurality of storage nodes each associated with one or more storage devices. The storage system is configured to provide at least one virtual volume distributed over the storage nodes for utilization by a plurality of host devices. The storage nodes are configured to support selection between multiple operating modes for handling input-output operations directed to the distributed virtual volume by the host devices. The multiple operating modes comprise at least a cached mode of operation in which consistency across the storage nodes for the distributed virtual volume when accessed by different ones of the host devices is ensured utilizing a distributed cache coherence protocol implemented by cooperative interaction of cache controllers of respective ones of the storage nodes, and a cacheless mode of operation in which consistency is ensured without utilizing the distributed cache coherence protocol and its associated cache controllers.

20 Claims, 9 Drawing Sheets

(51) Int. Cl.
*G06F 16/2455* (2019.01)
*G06F 11/20* (2006.01)
*H04L 29/14* (2006.01)
*H04L 29/08* (2006.01)
*G06F 16/27* (2019.01)

(52) U.S. Cl.
CPC .......... *H04L 67/2842* (2013.01); *H04L 69/40* (2013.01); *G06F 16/24552* (2019.01); *G06F 16/27* (2019.01)

(58) Field of Classification Search
CPC ............ G06F 11/2069; G06F 11/1451; G06F 11/1464; G06F 11/2058; G06F 11/1456; G06F 11/00; G06F 11/2074; G06F 11/1658; G06F 11/2089; G06F 2201/815; G06F 2201/84; G06F 3/0619; G06F 3/065; G06F 3/067; G06F 3/0665; H04L 67/1095; H04L 67/1097; H04L 67/22; H04L 67/2842; H04L 69/40
See application file for complete search history.

(56) References Cited

U.S. PATENT DOCUMENTS

| | | | |
|---|---|---|---|
| 7,975,018 B2 | 7/2011 | Unrau et al. | |
| 8,850,144 B1* | 9/2014 | Natanzon | G06F 11/20 711/162 |
| 9,037,818 B1* | 5/2015 | Natanzon | G06F 11/1456 711/162 |
| 9,063,994 B1* | 6/2015 | Natanzon | G06F 16/27 |
| 9,235,481 B1* | 1/2016 | Natanzon | G06F 16/273 |
| 9,235,516 B1* | 1/2016 | Marshak | G06F 12/0802 |
| 9,582,559 B1 | 2/2017 | Faibish et al. | |
| 9,881,014 B1* | 1/2018 | Bono | G06F 16/27 |
| 10,003,636 B1* | 6/2018 | Connolly | H04L 67/10 |
| 2003/0065892 A1* | 4/2003 | Bonola | G06F 5/10 711/147 |
| 2004/0186961 A1* | 9/2004 | Kimura | G06F 12/0888 711/138 |
| 2005/0076157 A1* | 4/2005 | Serizawa | G06F 3/0619 710/1 |
| 2005/0182769 A1* | 8/2005 | Fujita | G06F 3/0607 |
| 2006/0010341 A1* | 1/2006 | Kodama | G06F 3/0605 714/6.31 |
| 2006/0031450 A1* | 2/2006 | Unrau | H04L 67/1095 709/223 |
| 2012/0005430 A1* | 1/2012 | Watanabe | G06F 3/0613 711/130 |
| 2012/0311271 A1* | 12/2012 | Klein | G06F 12/0873 711/141 |
| 2013/0212345 A1* | 8/2013 | Nakajinna | G06F 3/0605 711/161 |
| 2013/0311685 A1* | 11/2013 | Kudo | G06F 3/0611 710/40 |
| 2015/0026417 A1* | 1/2015 | Guo | H04L 29/08 711/145 |
| 2015/0378921 A1* | 12/2015 | Karippara | G06F 9/45533 710/308 |
| 2016/0132433 A1* | 5/2016 | Hayashi | G06F 12/0866 711/118 |
| 2017/0277443 A1* | 9/2017 | Deguchi | G06F 3/0611 |
| 2017/0344479 A1* | 11/2017 | Boyer | G06F 12/0817 |
| 2018/0253383 A1* | 9/2018 | Saito | G06F 12/0238 |
| 2019/0079826 A1* | 3/2019 | Gianisis | G06F 11/0793 |

OTHER PUBLICATIONS

U.S. Patent Application filed in the name of Steven Bromling et al. on Oct. 31, 2017 and entitled "Storage System wth Distributed Input-Output Sequencing."

* cited by examiner

STORAGE SYSTEM WITH SELECTABLE CACHED AND CACHELESS MODES OF OPERATION FOR DISTRIBUTED STORAGE VIRTUALIZATION

FIELD

The field relates generally to information processing systems, and more particularly to storage in information processing systems.

BACKGROUND

Many information processing systems are configured to include multi-site storage system arrangements. In such arrangements, a multi-site storage system may be distributed over multiple geographically-dispersed locations. A more particular example of a multi-site storage system is a virtual metro cluster, in which the sites may be within different regions of a metropolitan area or other geographic area and interconnected to communicate with one another via a wide area network (WAN). The different sites may correspond, for example, to different data centers of a business or other enterprise.

Each of the sites of the multi-site storage system may replicate file systems associated with the other sites, so as provide file system recovery capability in the event of failure of one or more of the sites. The remote site file systems that are replicated at the given site are also referred to as mirror file systems. Each primary file system of the multi-site storage system may include both cache and disk storage resources, and data written to a file system may be held in cache for a certain period of time before it is sent to disk. Some arrangements of this type provide so-called active-active data access in both primary and replicated file systems, where "active-active" indicates that both primary and replicated file systems of a given site are mounted as read-write file systems. For example, see U.S. Pat. No. 9,582,559, entitled "Multi-Site Storage System with Replicated File System Synchronization Utilizing Virtual Block Storage Appliances," which is incorporated by reference herein. Despite the significant advantages associated with these arrangements, a need exists for further improvements. For example, it would be desirable to provide additional flexibility in the configuration of active-active data access arrangements within multi-site storage systems.

SUMMARY

Illustrative embodiments provide storage systems with selectable cached and cacheless modes of operation for handling input-output (TO) operations in conjunction with distributed storage virtualization. Such embodiments implement active-active storage arrangements across multi-site storage systems in a particularly efficient and flexible manner. For example, some embodiments are configured to provide independent selectability between cached and cacheless modes of operations on a per-volume basis for multiple distributed virtual volumes of a multi-site storage system.

In one embodiment, an apparatus comprises a storage system including a plurality of storage nodes each associated with one or more storage devices. The storage system is configured to provide at least one virtual volume distributed over the storage nodes for utilization by a plurality of host devices. The storage nodes are configured to support selection between multiple operating modes for handling IO operations directed to the distributed virtual volume by the host devices, with the multiple operating modes comprising at least a cached mode of operation in which consistency across the storage nodes for the distributed virtual volume when accessed by different ones of the host devices is ensured utilizing a distributed cache coherence protocol implemented by cooperative interaction of cache controllers of respective ones of the storage nodes, and a cacheless mode of operation in which consistency across the storage nodes for the distributed virtual volume when accessed by different ones of the host devices is ensured without utilizing the distributed cache coherence protocol and its associated cache controllers of the respective storage nodes.

The storage system in some illustrative embodiments comprises a multi-site storage system, with the plurality of storage nodes comprising at least a first storage node cluster at a first site and a second storage node cluster at a second site. Each of the first and second storage clusters illustratively provides access to at least one storage array comprising a plurality of storage devices at the corresponding site. Numerous other storage system arrangements are possible in other embodiments.

In some embodiments, the cacheless mode of operation is configured to ensure consistency across the storage nodes for the distributed virtual volume when accessed by different ones of the host devices through utilization of a distributed IO sequencer implemented by cooperative interaction of IO sequencers of respective ones of the storage nodes. A particular one of the IO sequencers is designated as volume owner of the distributed virtual volume for a given period of time and remaining ones of the IO sequencers must request access to specified regions of the distributed virtual volume from the designated volume owner during that period of time. The volume owner is configured to grant a lock on a specified region of the distributed virtual volume to a given one of the remaining IO sequencers responsive to a corresponding request from that IO sequencer. In that case, the given IO sequencer is the only one of the IO sequencers permitted to process IO operations directed to the specified region of the distributed virtual volume while the lock remains in place.

By way of example, selection between the cached mode of operation and the cacheless mode of operation may be made dynamically at run-time for the distributed virtual volume without disruption of any IO operations directed to the distributed virtual volume by one or more of the host devices.

The storage system in some embodiments is configured to provide a plurality of virtual volumes distributed over the storage nodes for utilization by the plurality of host devices. In an arrangement of this type, selection between the cached mode of operation and the cacheless mode of operation may be made independently for each of at least a subset of the distributed virtual volumes, such that at least one of the distributed virtual volumes operates in the cached mode of operation simultaneously with one or more other ones of the distributed virtual volumes operating in the cacheless mode of operation.

A given one of the distributed virtual volumes operating in the cached mode of operation may be controllably transitioned to the cacheless mode of operation based at least in part on one or more cache utilization statistics that are maintained for the given distributed virtual volume in the cached mode of operation falling below one or more specified threshold levels. The cache utilization statistics may comprise at least one of a percentage of IO operations directed to the given distributed virtual volume that benefit from operation in the cached mode of operation and a latency reduction experienced by IO operations directed to the given distributed virtual volume when operating in the cached mode of operation.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
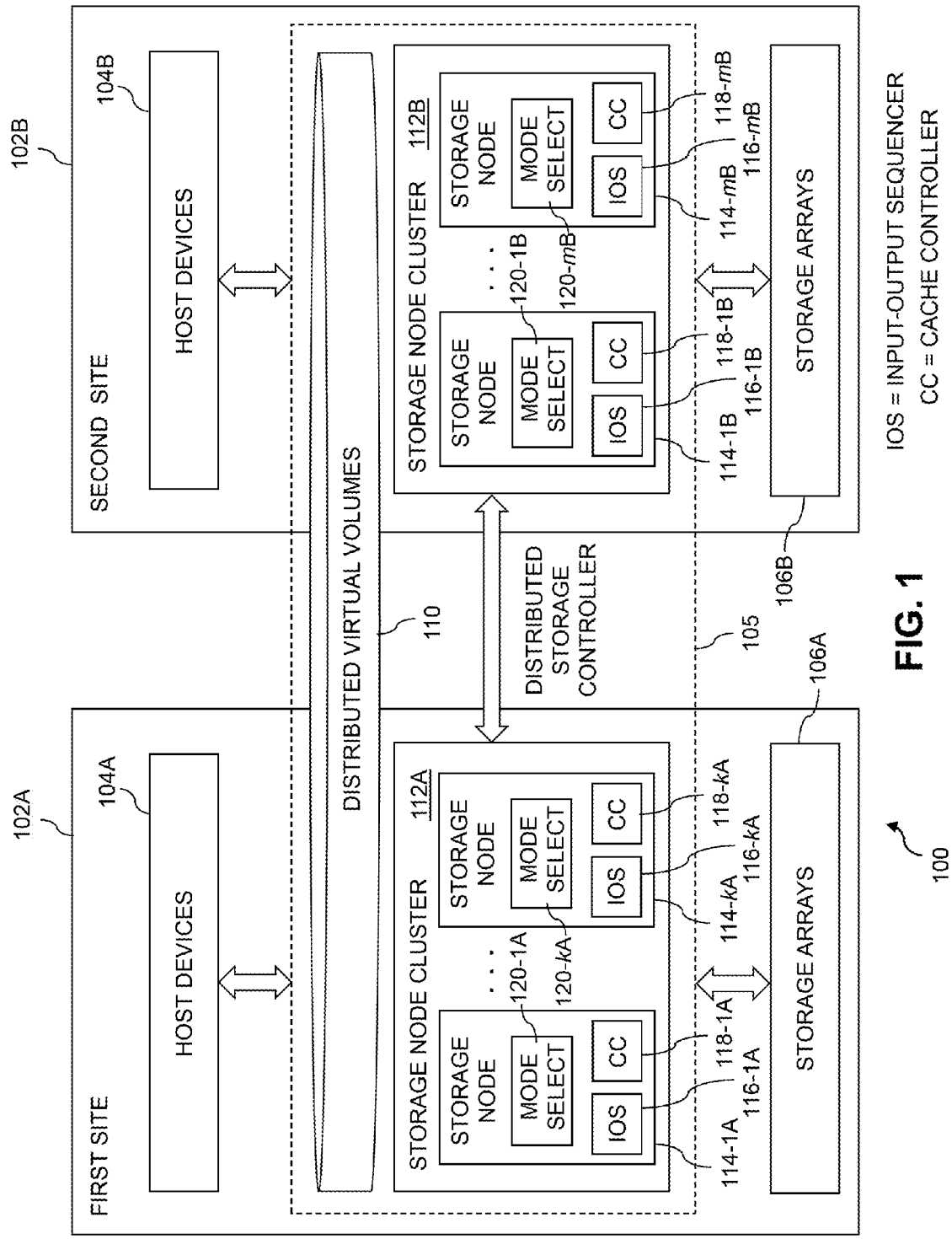
FIG. 1 is a block diagram of an information processing system comprising a multi-site storage system with selectable cached and cacheless modes of operation for distributed storage virtualization in an illustrative embodiment.

FIG. 1 shows an information processing system 100 configured in accordance with an illustrative embodiment. The information processing system 100 comprises first and second sites 102A and 102B, comprising respective first and second sets of host devices 104A and 104B. The first and second sites 102A and 102B collectively implement a multi-site storage system that includes a distributed storage controller 105 and sets of storage arrays 106A and 106B, at the respective first and second sites 102A and 102B.

System components at multiple sites that are referred to herein using the A and B designators are also collectively referred to herein using just the corresponding reference numeral without the designators. For example, host devices 104A and 104B are also collectively referred to elsewhere herein as host devices 104.

The first and second sites 102A and 102B are assumed to be interconnected by one or more networks not explicitly shown in the figure. For example, the first and second sites can be interconnected by a network comprising a portion of a global computer network such as the Internet, although other types of networks can be part of such a network, including a wide area network (WAN), a local area network (LAN), a satellite network, a telephone or cable network, a cellular network, a wireless network such as a WiFi or WiMAX network, or various portions or combinations of these and other types of networks.

A network interconnecting the first and second sites 102A and 102B in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first and second sites 102A and 102B of system 100 may comprise respective primary and remote sites of a multi-site storage system, with the multiple sites being interconnected by a WAN. Additionally or alternatively, the first and second sites 102A and 102B may comprise respective sites of a metropolitan area cluster, or respective geographically-separated data centers implemented in cloud infrastructure. Again, these are only examples, and numerous other arrangements can be used.

In some embodiments, the first and second sites 102A and 102B are assumed to be associated with respective source and target sites of a replication process. For example, the first site may comprise a production site data center and the second site may comprise a disaster recovery site data center.

The host devices 104A and 104B illustratively comprise respective sets of compute nodes that access the distributed virtual volumes over one or more networks of the type previously described. For example, the host devices 104A and 104B may comprise at least portions of an enterprise computer system or other arrangement of multiple compute nodes associated with respective users.

The host devices 104A and 104B illustratively comprise respective processing devices of one or more processing platforms. For example, one or more of the host devices 104A and 104B can comprise respective virtual machines each having a processor and a memory, although numerous other configurations are possible. Accordingly, the host devices 104A and 104B can be part of cloud infrastructure such as an Amazon Web Services (AWS) system. Other examples of cloud-based systems that can be used to provide at least a subset of the host devices 104A and 104B and possibly other portions of system 100 include Google Cloud Platform (GCP) and Microsoft Azure.

The host devices 104A and 104B in some embodiments illustratively provide compute services such as execution of one or more applications on behalf of each of one or more users associated with respective ones of those host devices.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The multi-site storage system in the FIG. 1 embodiment is configured to provide virtual volumes 110 that are distributed across the first and second sites 102A and 102B for utilization by the host devices 104A and 104B. The virtual volumes 110 are also referred to herein as respective "distributed virtual volumes."

A given such distributed virtual volume is illustratively configured for utilization by at least one of the host devices 104A of the first site 102A and at least one of the host devices 104B of the second site 102B, although numerous other arrangements are possible. For example, the distributed virtual volume may comprise at least one logical unit (LUN) of the multi-site storage system that is mirrored from the first site 102A to the second site 102B so as to permit active-active access to that LUN from one or more of the host devices 104A at the first site 102A and one or more of the host devices 104B at the second site 102B. Such LUNs are illustratively configured to store files, blocks, objects or other arrangements of data on behalf of users associated with host devices 104A and 104B.

The system 100 further comprises a first storage node cluster 112A at the first site 102A and a second storage node cluster 112B at the second site 102. The first and second storage clusters 112A and 112B provide access to respective ones of the sets of storage arrays 106A and 106B, each of which is assumed to comprise a plurality of storage devices at the corresponding site 102A or 102B of the system 100.

The storage node cluster 112A comprises a plurality of storage nodes 114-1A through 114-kA. Similarly, the storage node cluster 112B comprises a plurality of storage nodes 114-1B through 114-mB.

As will be described in more detail below, each of the storage nodes 114 comprises a corresponding one of a plurality of IO sequencers 116, a corresponding one of a plurality of cache controllers 118 and a corresponding one of a plurality of mode select modules 120. The cache controllers 118 are assumed to be incorporated in or otherwise associated with respective caches implemented in respective memories of the storage nodes 114, although such caches are not explicitly shown in the figure.

Each of the storage nodes 114 therefore comprises a set of one or more processing modules configured to communicate over one or more networks with corresponding sets of processing modules on other ones of the storage nodes 114. The sets of processing modules of the storage nodes 114 collectively comprise at least a portion of the distributed storage controller 105 that supports the distributed virtual volumes 110 utilizing corresponding parts of the underlying storage arrays 106A and 106B.

The storage nodes 114 are configured to support selection between multiple operating modes for handling TO operations directed to a given one of the distributed virtual volumes 110 by one or more of the host devices 104. The multiple operating modes in the present embodiment comprise at least a cached mode of operation in which consistency across the storage nodes 114 for the distributed virtual volume when accessed by different ones of the host devices 104 is ensured utilizing a distributed cache coherence protocol implemented by cooperative interaction of the cache controllers 118 of respective ones of the storage nodes 114, and a cacheless mode of operation in which consistency across the storage nodes 114 for the distributed virtual volume when accessed by different ones of the host devices 104 is ensured without utilizing the distributed cache coherence protocol and its associated cache controllers 118 of the respective storage nodes 114. Numerous additional or alternative modes of operation can be supported in other illustrative embodiments.

The cached mode of operation in some embodiments utilizes a distributed cache coherence protocol of the type described in U.S. Pat. No. 7,975,018, entitled "Systems and Methods for Providing Distributed Cache Coherence," which is incorporated by reference herein. Additionally or alternatively, illustrative embodiments can utilize VPLEX® storage products from Dell EMC of Hopkinton, Mass. to implement distributed cache coherence functionality in the cache controllers 118 of the storage nodes 114. Other types of distributed cache coherence arrangements known to those skilled in the art can be implemented in the illustrative embodiments disclosed herein.

The cacheless mode of operation in the present embodiment is configured to ensure consistency across the storage nodes 114 for the distributed virtual volume when accessed by different ones of the host devices 104 through utilization of a distributed TO sequencer implemented by cooperative interaction of the IO sequencers 116 of respective ones of the storage nodes 114.

Selection between the cached mode of operation and the cacheless mode of operation may be made independently for each of at least a subset of the distributed virtual volumes 110. Accordingly, it is possible that at least one of the distributed virtual volumes 110 operates in the cached mode of operation simultaneously with one or more other ones of the distributed virtual volumes 110 operating in the cacheless mode of operation. Information specifying which of the cached operating mode and the cacheless operating mode is to be utilized for a given one of the distributed virtual volumes 110 is stored as part of a set of metadata maintained for the given distributed virtual volume.

As indicated previously, the storage nodes 114 comprise respective IO sequencers 116 for handling IO operations directed to one or more of the distributed virtual volumes 110 by the host devices 104A and 104B in the above-noted cacheless mode of operation. More particularly, the storage nodes 114-1A through 114-kA comprise respective IO sequencers 116-1A through 116-kA, and the storage nodes 114-1B through 114-mB comprise respective IO sequencers 116-1B through 116-mB.

Additionally, the storage nodes 114-1A through 114-kA comprise respective cache controllers ("CCs") 118-1A through 118-kA, and the storage nodes 114-1B through 114-mB comprise respective cache controllers 118-1B through 118-mB. The cache controllers 118 are illustratively configured to collectively implement a distributed cache coherence protocol. For example, as noted above, the cache controllers 118 can be configured at least in part utilizing VPLEX® storage products suitably modified to support selection between cached and cacheless modes of operation as disclosed herein.

Furthermore, the storage nodes 114-1A through 114-kA comprise respective mode select modules 120-1A through 120-kA, and the storage nodes 114-1B through 114-mB comprise respective mode select modules 120-1B through 120-mB. The mode select modules 120 are configured to switch their respective storage nodes 114 between cached and cacheless modes of operation for at least a given one of the distributed virtual volumes 110 as described in more detail elsewhere herein.

Variables such as k and m used herein are assumed to be positive integers greater than one, and may but need not be equal.

In some embodiments, a given one of the distributed virtual volumes 110 operating in the cached mode of operation is controllably transitioned to the cacheless mode of operation based at least in part on one or more cache utilization statistics that are maintained for the given distributed virtual volume in the cached mode of operation falling below one or more specified threshold levels.

The cache utilization statistics may comprise at least one of a percentage of IO operations directed to the given distributed virtual volume that benefit from operation in the cached mode of operation and a latency reduction experienced by IO operations directed to the given distributed virtual volume when operating in the cached mode of operation.

In some embodiments, selection between the cached mode of operation and the cacheless mode of operation is made dynamically at run-time for the distributed virtual volume. The selection may be made via an application programming interface (API) exposed by the storage system to one or more of the host devices 104 and without disruption of any IO operations directed to the distributed virtual volume by one or more of the host devices 104. Numerous other techniques can be used to manually or automatically select a particular one of the cached and cacheless modes of operation.

For example, in conjunction with a transition from one of the cached and cacheless modes of operation to the other of the cached and cacheless modes of operation for the distributed virtual volume, the cached and cacheless modes of operation are concurrently executed in a stacked configuration relative to one another until such time as a complete switch from one of the modes of operation to the other can be made without disruption of IO operations.

If the transition is from the cached mode of operation to the cacheless mode of operation, cached IO data is evicted prior to switching from the cached mode of operation to the cacheless mode of operation.

As another example, in conjunction with a transition from one of the cached and cacheless modes of operation to the other of the cached and cacheless modes of operation for the distributed virtual volume, IO operations directed to the distributed virtual volume may be temporarily suspended for a period of time sufficient to complete any in-process IO operations.

If the transition is from the cached mode of operation to the cacheless mode of operation, cached IO data is evicted prior to switching the IO operations from a cached IO path to a cacheless IO path arranged in parallel with the cached IO path.

Accordingly, some embodiments are configured to utilize parallel cached and cacheless IO paths within the storage nodes 114, with switching between the cache controllers 118 of the cached IO paths and the IO sequencers 116 of the cacheless IO paths being carried out under the control of the mode select modules 120. Such multiplexing of cached and cacheless IO paths within the storage nodes 114 allows for particularly efficient and flexible implementations of distributed storage virtualization. As indicated above, stacked configurations of the cached and cacheless modes of operation can be implemented in conjunction with switching between such cached and cacheless IO paths.

In some embodiments, the mode select modules 120 of the respective storage nodes 114 switch between the cached and cacheless mode of operation based at least in part on the type of workloads being processed by the host devices 104.

For example, in embodiments in which the back-end storage arrays 106 incorporate relatively large caches or relatively fast storage media, many workloads may not benefit significantly from use of a cached mode of operation. In such embodiments, substantial performance improvements can be obtained through use of lightweight distributed IO sequencing in the cacheless mode of operation instead of the typically more complex cache coherence protocol of the cached mode of operation.

The cacheless mode of operation also facilitates interacting with array-side business continuance mechanisms, such as Remote Data Facility (RDF) replication processes, without the timing issues and other complexities that can arise when using these continuance mechanisms in the cached mode. Third-party virtualization products such as SAN volume controller (SVC) may similarly benefit from supporting cacheless operation for cache-hostile workloads while in front of modern fast storage arrays.

However, illustrative embodiments are also configured to permit utilization of the cached mode of operation for cache-hungry workloads that can derive the most substantial benefit from that operating mode, possibly in implementations in which the back-end storage arrays 106 incorporate relatively small caches or no caches at all, or otherwise include relatively slow storage media.

Cache-friendly workloads also experience performance gains, as otherwise potentially heavy cache replacement pressure is significantly alleviated by increasing numbers of distributed virtual volumes being operated in the cacheless mode of operation. Cached data pages for the remaining distributed virtual volumes that are operating in the cached mode can stay in cache longer, increasing the temporal locality period, and resulting in more cache hits and lower average IO latency.

These and other illustrative embodiments are configured to support selection of cached or cacheless modes of operation on a per-volume basis with corresponding toggling between cached and cacheless IO paths for each of the distributed virtual volumes 110. Such arrangements allow some of the distributed virtual volumes 110 to be operated in the cached mode, while others are simultaneously operated in the cacheless mode.

The toggling between cached and cacheless IO paths for a given distributed virtual volume can be implemented by configuring cached and cacheless layers of the storage node clusters 112 to register common API handlers with a corresponding client in the form of a suitably-modified VPLEX® front-end. One such implementation would store these handlers as function pointers, which avoids introducing conditional tests on the IO paths. Both the cached layer and the cacheless layer can be configured to pass IO operations down to a device layer of the storage node clusters 112 and thence to the underlying storage arrays 106 through common APIs. Configuration of the cached or cacheless operating mode and corresponding IO path selected for a given distributed virtual volume becomes part of the metadata for that volume, and changes can be made through a user interface (UI) such as a VPLEX® UI.

As mentioned previously, the storage system can be configured to dynamically switch between the cached and cacheless modes of each of the distributed virtual volumes 110 at run-time without disruption to host IO operations.

A more particular example of a process for transitioning from the cached mode to the cacheless mode is as follows:

1. Leverage the above-noted common APIs to stack the cacheless distributed IO sequencer implementation in front of the cache of the cached implementation for a given distributed virtual volume. All new IO operations go from the distributed IO sequencer to the cache.

2. Wait for all pre-existing IO operations (i.e., those not known to the distributed IO sequencer) to drain. At this point, it is safe for new IO operations to avoid the cache and such operations should do so.

3. Wait for any remaining IO operations in the cache to drain. The cached data pages of the distributed virtual volume are then evicted from the cache, such that the volume is now cacheless and can operate in the cacheless mode.

For transitions from the cacheless mode to the cached mode, the above-described process can be reversed in a straightforward manner.

The above-described process does not require suspension of new IO operations, and rather than switching between the two modes of operation at a period of quiescence, stacks the cacheless and cached implementations together, with the cacheless distributed IO sequencer implementation being arranged in front of the cache of the cached implementation. The stacked configuration of cacheless and cached implementations remains in place until the cached IO path no longer needs to be used, for example, by orchestrating whether the cacheless IO path interacts with the cache or bypasses it.

Another example of a transition process is to suspend new IO requests by temporarily queuing those requests above the cached and cacheless layers, while draining active IO requests and evicting the cache if necessary before switching the IO path. While this process incurs a short disruption to host IO operations, the disruption is much shorter than a failure recovery interval and therefore not significant.

In some embodiments, the storage system is configured to start automatically in the cached mode of operation and gradually transition over to the cacheless mode of operation. Such an arrangement can mitigate the risk of a cached or cacheless mode-related performance degradation for critical applications.

An example of a process for transitioning applications over gradually from the cached mode to the cacheless mode based on measured cache utilization and impact is as follows:

1. After upgrading to a storage system with selectable cached and cacheless modes of operation as disclosed herein, a customer is instructed to run its application for a period of time while the storage system collects per-volume cache utilization statistics (e.g., the ratio of IO operations that benefit from the cache, and the latency reduction experienced as a result of caching).

2. When the customer is ready, an initial group of distributed virtual volumes is transitioned from the cached mode of operation to the cacheless mode of operation. The volumes selected for transition in this initial group are those volumes with cache utilization statistics falling below a threshold that guarantees that the volumes will experience a performance benefit from cacheless operation.

3. After again running and collecting statistics on the remaining volumes operating in the cached mode for a period of time, another group of distributed virtual volumes is transitioned from the cached mode to the cacheless mode. The volumes selected for transition in this second group are those volumes that based on cache utilization statistics are unlikely to experience a performance degradation from the transition.

4. For any workloads that remain operating in the cached mode, the workloads can be examined in more detail to determine the most appropriate mode of operation. Adjustments can be made to the workloads if appropriate to facilitate usage of the cacheless mode of operation to the extent possible.

At any time, the customer may choose to switch any application from the cached mode to the cacheless mode if the customer is confident that the importance of the application does not merit or require caching. The customer can similarly switch any application from the cacheless mode back to the cached mode if necessary. An application is switched from the cached mode to the cacheless mode and vice-versa by switching all of its corresponding distributed virtual volumes.

The storage system can also be configured to automatically select candidates for cacheless operation and transition them, since it is inexpensive to do so. Latency could be measured before and after the transition to determine whether or not performance has improved, and any volumes that suffer performance degradations from the transition would automatically be transitioned back to their previous operating mode.

Additional details regarding example features of the cacheless mode of operation in the FIG. 1 embodiment and one or more other illustrative embodiments will now be described.

In the above-noted cacheless mode of operation, the IO sequencers 116 of the respective storage nodes 114 are configured to interact with one another to collectively form a distributed IO sequencer that ensures consistency across the storage nodes 114 for a given one of the distributed virtual volumes 110 when accessed by different ones of the host devices 104A and 104B. The distributed IO sequencer is part of the distributed storage controller 105 and spans the sites 102A and 102B.

In ensuring consistency across the storage nodes 114 for a given one of the distributed virtual volumes 110 when accessed by different ones of the host devices 104A and 104B in the cacheless mode of operation, the distributed IO sequencer collectively formed by the IO sequencers 116 of the respective storage nodes is configured to designate a particular one of the IO sequencers 116 as volume owner of the distributed virtual volume for a given period of time. As a result of this designation, remaining ones of the IO sequencers 116 must request access to specified regions of the distributed virtual volume from the designated volume owner during that period of time.

The volume owner is typically on one of the storage nodes 114 for which its corresponding IO sequencer 116 is actively handling IO operations directed to the distributed virtual volume for at least one of the host devices 104.

The volume owner is further configured to grant a lock on a specified region of the distributed virtual volume to a given one of the remaining IO sequencers 116 responsive to a corresponding request from that IO sequencer. The given IO sequencer is the only one of the IO sequencers 116 permitted to process IO operations directed to the specified region of the distributed virtual volume while the lock remains in place.

If the volume owner receives one or more additional requests from one or more other ones of the remaining IO sequencers 116 for access to the specified region of the distributed virtual volume while the lock on the specified region is granted to the given IO sequencer, the volume owner queues the one or more additional requests, and responsive to the lock being released by the given IO sequencer, the volume owner grants the lock to the other IO sequencer that generated an initial one of the one or more additional requests.

The volume owner processes incoming requests for access to specified regions of the distributed virtual volume in ascending order of block addresses from an initial block denoted block 0 to a final block denoted block n–1 where n denotes the size in blocks of the distributed virtual volume. Any requests for access to particular block addresses in a specified region for which the corresponding IO sequencer already has a lock are automatically granted and any requests for access to particular block addresses in a specified region for which the corresponding IO sequencer does not have a lock are automatically queued to wait for a lock.

In some embodiments, the particular IO sequencer that is designated as volume owner for the given period of time is determined at least in part based on IO statistics maintained for the distributed virtual volume, such that the volume owner designation varies over multiple such time periods responsive to variations in the IO statistics. For example, the particular IO sequencer that is designated as volume owner for the given period of time may be the IO sequencer handling a highest volume of IO operations for the distributed virtual volume among all of the IO sequencers 116 for a corresponding monitoring interval.

The volume owner may be changed from a source volume owner corresponding to a first one of the IO sequencers 116 to a target volume owner corresponding a second one of the IO sequencers 116. In conjunction with such a change, all active lock and queued request state information is transferred from the source volume owner to the target volume owner. Any requests for access to specified regions of the distributed virtual volume arriving at the source volume owner after the change are forwarded by the source volume owner to the target volume owner and the target volume owner is identified to the requesting IO sequencers 116.

Additionally or alternatively, the particular IO sequencer that is designated as volume owner may be changed responsive to at least one of a failure in its corresponding one of the storage nodes 114 and an addition of one or more new storage nodes to the plurality of storage nodes 114 of the storage system.

Responsive to a failure in one of the storage nodes 114 corresponding to one of the IO sequencers 116 for which one or more locks have been granted by the volume owner, the volume owner automatically releases any such locks granted to that IO sequencer.

Also, responsive to a failure in one of the storage nodes 114 corresponding to the particular IO sequencer 116 currently designated as volume owner, a new volume owner is selected from among the remaining IO sequencers 116. The new volume owner reconstructs all active lock and queued request state information from information that it receives from the other IO sequencers so as to permit all in-process IO operations to complete.

Additional or alternative IO sequencing functionality can be implemented using the IO sequencers 116 of the distributed storage controller 105 in other embodiments. Such IO sequencing functionality is illustratively configured to ensure consistency across the storage nodes 114 for a given one of the distributed virtual volumes 110 in a cacheless mode of operation. Consistency is ensured in a similar manner for other ones of the distributed virtual volumes 110 in the cacheless mode of operation.

As mentioned previously, the distributed virtual volumes 110 correspond to portions of the underlying storage arrays 106A and 106B of the respective first and second sites 102A and 102B that implement the multi-site storage system.

A wide variety of different types of storage devices can be utilized in the storage arrays 106A and 106B of the multi-site storage system of FIG. 1. For example, at least a subset of the storage devices may comprise solid state drives (SSDs). Such SSDs are illustratively implemented using non-volatile memory (NVM) devices such as flash memory. Other types of NVM devices that can be used to implement at least a portion of the storage devices in one or more of the storage arrays 106A and 106B include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given site of a multi-site storage system as the term is broadly used herein can include a combination of different types of storage devices, as in an embodiment in which each site of the multi-site storage system implements multiple storage tiers, which may illustratively include a flash-based fast tier and a disk-based capacity tier. In such an embodiment, each of the fast tier and the capacity tier of the given site of the multi-site storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

As a more particular example, one or more of the storage arrays 106A and 106B of the multi-site storage system in some embodiments comprises scale-out all-flash storage arrays such as an XtremIO™ storage arrays from Dell EMC. Other types of storage arrays, including by way of example Unity™, VNX® and Symmetrix VMAX® storage arrays also from Dell EMC, can be used to implement storage systems in other embodiments. These and other storage arrays used in illustrative embodiments can be configured to provide storage redundancy using well-known RAID techniques such as RAID 1, although other storage redundancy configurations can be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As indicated above, the system 100 of the FIG. 1 embodiment is assumed to be implemented using one or more processing platforms comprising processing devices each having a processor coupled to a memory. Such processing devices can illustratively include particular arrangements of compute, storage and network resources. For example, processing devices in some embodiments are implemented at least in part utilizing virtual resources such as virtual machines, Docker containers or other types of Linux containers (LXCs), or combinations of both as in an arrangement in which Docker containers or other types of LXCs are configured to run on virtual machines.

As a more particular example, the IO sequencers 116, cache controllers 118 and mode select modules 120 of the distributed storage controller 105 can each be implemented in the form of one or more LXCs running on one or more virtual machines. Other arrangements of one or more processing devices of a processing platform can be used to implement the IO sequencers 116, cache controllers 118 and mode select modules 120 of the distributed storage controller 105. Other portions of the system 100 can similarly be implemented using one or more processing devices of at least one processing platform.

The multiple sites 102A and 102B of system 100 may be implemented on respective distinct processing platforms, although numerous other arrangements are possible. For example, in some embodiments at least portions of the multiple sites 102A and 102B are implemented on the same processing platform.

The term "processing platform" as used herein is intended to be broadly construed so as to encompass, by way of illustration and without limitation, multiple sets of processing devices and associated storage systems that are configured to communicate over one or more networks. For example, certain components of the first site 102A of the system 100 can reside in one or more data centers in a first geographic location while corresponding components of the second site 102B of the system 100 reside in one or more other data centers in a second geographic location that is potentially remote from the first geographic location.

It is to be appreciated that these and other features of illustrative embodiments are presented by way of example only, and should not be construed as limiting in any way.

Accordingly, different numbers, types and arrangements of system components such as host devices 104, distributed storage controller 105, storage arrays 106, storage clusters 112, storage nodes 114, IO sequencers 116, cache controllers 118 and mode select modules 120 can be used in other embodiments.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given storage system with functionality for selectable cached and cacheless modes of operation for distributed storage virtualization can be offered to cloud infrastructure customers or other users as a PaaS offering.

Figure 2:
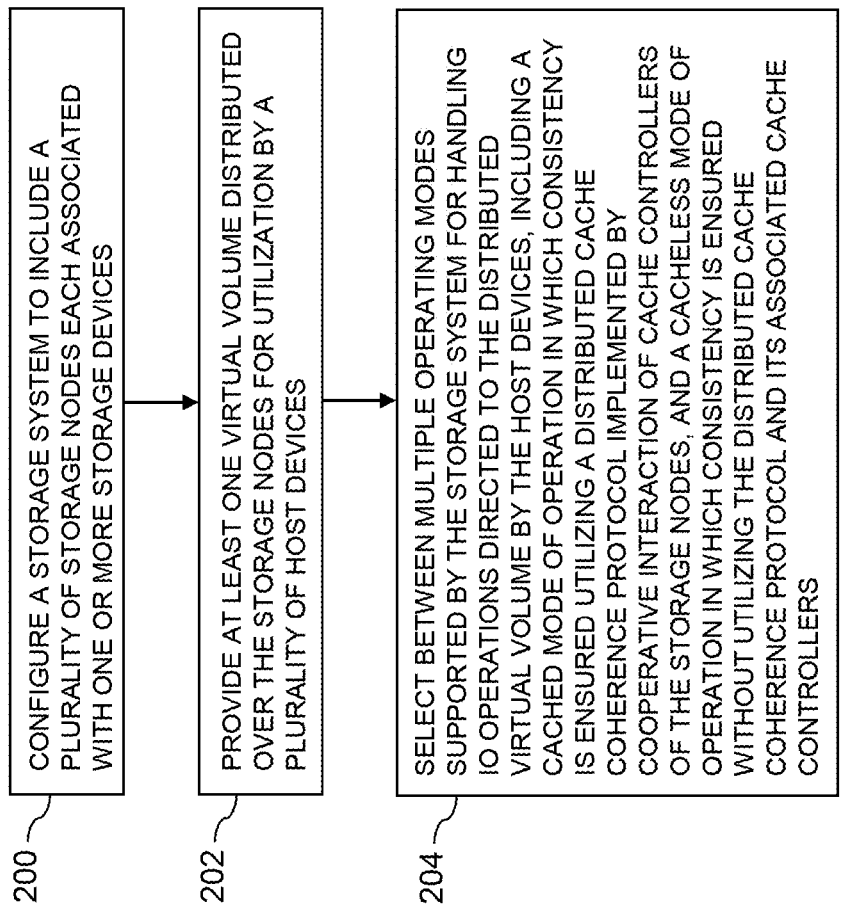
FIG. 2 is a flow diagram of a process for implementing selectable cached and cacheless modes of operation for distributed storage virtualization using multiple storage nodes in an illustrative embodiment.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of information processing systems implementing selectable cached and cacheless modes of operation as disclosed herein. The steps of the process of FIG. 2 are assumed to be performed primarily by one or more processing platforms each comprising multiple processing devices illustratively corresponding to respective storage nodes, operating in cooperation with associated back-end storage arrays.

In step 200, a storage system is configured to include a plurality of storage nodes each associated with one or more storage devices. The storage system is illustratively a multi-site storage system, with clusters of multiple storage nodes arranged at respective ones of at least first and second sites, although in other embodiments the storage nodes can all be arranged at a single site, such as within a given data center or enterprise location. Each of the storage nodes illustratively provides access to a corresponding portion of at least one storage array or other arrangement of storage devices.

In step 202, at least one virtual volume is provided in the storage system. The virtual volume is distributed over the storage nodes for utilization by a plurality of host device, and is therefore referred to as a "distributed virtual volume." Such a distributed virtual volume is assumed to be accessible to multiple host devices, possibly associated with the same user. For example, one or more host devices at a first one of the sites may be associated with a particular business or other user that has been assigned a distributed virtual volume. One or more other host devices at a second one of the sites is also associated with the particular business or other user and has access to the same distributed virtual volume. Numerous other access arrangements between host devices and distributed virtual volumes are possible.

In step 204, a selection is made between multiple operating modes supported by the storage system for handling IO operations directed to the distributed virtual volume by the host devices. The multiple operating modes include at least a cached mode of operation in which consistency is ensured utilizing a distributed cache coherence protocol implemented by cooperative interaction of cache controllers of the storage nodes, and a cacheless mode of operation in which consistency is ensured without utilizing the distributed cache coherence protocol and its associated cache controllers.

In some embodiments, the storage system is configured to provide a plurality of virtual volumes distributed over the storage nodes for utilization by the plurality of host devices. The selection between the cached mode of operation and the cacheless mode of operation can be made independently for each of at least a subset of the distributed virtual volumes, such that at least one of the distributed virtual volumes operates in the cached mode of operation simultaneously with one or more other ones of the distributed virtual volumes operating in the cacheless mode of operation.

The cacheless mode of operation is illustratively configured to ensure consistency across the storage nodes for the distributed virtual volume when accessed by different ones of the host devices through utilization of a distributed IO sequencer implemented by cooperative interaction of IO sequencers of respective ones of the storage nodes.

More particularly, IO sequencers are implemented in respective ones of the storage nodes for handling IO operations generated by the host devices, with the IO sequencers of the respective storage nodes interacting with one another to collectively form a distributed IO sequencer that ensures consistency across the storage nodes for the distributed virtual volume when accessed by different ones of the host devices in the cacheless mode of operation.

For example, in some embodiments, consistency is ensured for the distributed virtual volume by designating a particular one of the IO sequencers as volume owner of the distributed virtual volume for a given period of time, and requiring that remaining ones of the IO sequencers request access to specified regions of the distributed virtual volume from the designated volume owner during that period of time. The volume owner is configured to grant a lock on a specified region of the distributed virtual volume to a given one of the remaining IO sequencers responsive to a corresponding request from that IO sequencer. The given IO sequencer is the only one of the IO sequencers permitted to process IO operations directed to the specified region of the distributed virtual volume while the lock remains in place.

As noted above, if the volume owner receives one or more additional requests from one or more other ones of the remaining IO sequencers for access to the specified region of the distributed virtual volume while the lock on the specified region is granted to the given IO sequencer, the volume owner queues the one or more additional requests, and responsive to the lock being released by the given IO sequencer, the volume owner grants the lock to the other IO sequencer that generated an initial one of the one or more additional requests.

Also as indicated previously, the volume owner illustratively processes incoming requests for access to specified regions of the distributed virtual volume in ascending order of block addresses from an initial block denoted block 0 to a final block denoted block n−1 where n denotes the size in blocks of the distributed virtual volume. Any requests for access to particular block addresses in a specified region for which the corresponding IO sequencer already has a lock are automatically granted and any requests for access to particular block addresses in a specified region for which the corresponding IO sequencer does not have a lock are automatically queued to wait fora lock.

The particular IO sequencer that is designated as volume owner for the given period of time may be determined at least in part based on IO statistics maintained for the distributed virtual volume, such that the volume owner designation varies over multiple such time periods responsive to variations in the IO statistics. Additional or alternative factors may be taken into account in selecting a particular one of the IO sequencers as the volume owner for a given distributed virtual volume in the cacheless mode of operation.

It is also to be appreciated that the FIG. 2 process and other features and functionality for selectable cached and cacheless modes of operation as described above can be adapted for use with other types of information systems, including by way of example an information processing system in which two or more sites of an associated multi-site storage system are both implemented on the same processing platform. The term "site" as used herein should therefore not be construed as requiring any particular geographical relationship to other sites.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving selectable cached and cacheless modes of operation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for selectable cached and cacheless modes of operation for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a distributed storage controller such as distributed storage controller 105 of system 100 that is configured in accordance with one or more steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The distributed storage controller 105, as well as other system components, may be implemented at least in part using processing devices of such processing platforms. For example, respective IO sequencers 116, cache controller 118, mode select modules 120 or other distributed modules of the distributed storage controller 105 can be implemented at least in part in respective LXCs running on respective ones of the processing devices of a processing platform.

Additional details of illustrative embodiments will now be described with reference to FIGS. 3 through 9, which are inter-node signaling diagrams showing example distributed IO sequencing operations carried out between components of the system 100 in one possible implementation of a cacheless mode of operation. More particularly, in these embodiments, particular ones of the IO sequencers 116 interact with other ones of the IO sequencers 116 in order to ensure consistency for a given one of the distributed virtual volumes 110. At different points in time or under other conditions, certain ones of the IO sequencers 116 on respective ones of the storage nodes 114 are designated as requestors or volume owners. Such designations vary over time in the course of operation of the multi-site storage system comprising storage node clusters 112A and 112B.

Figure 3:
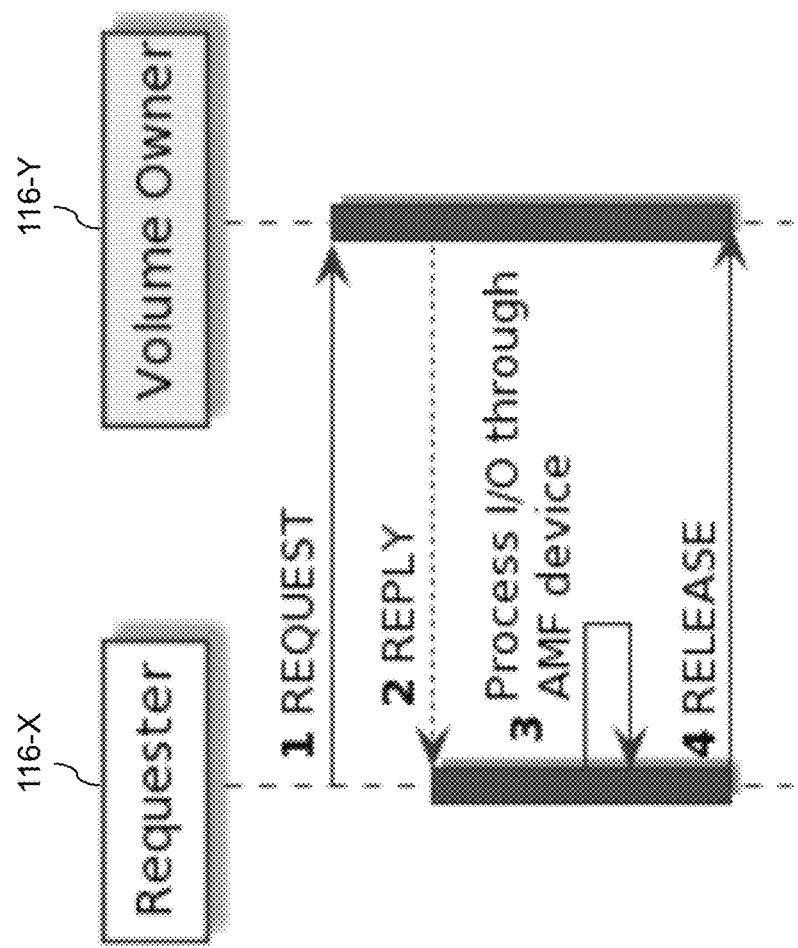
FIGS. 3 through 9 are inter-node signaling diagrams illustrating aspects of an example cacheless mode of operation utilizing distributed IO sequencing functionality in illustrative embodiments.

Referring now to FIG. 3, a particular one of the IO sequencers 116 designated as requester 116-X generates a request for access to a specified region of a given one of the distributed virtual volumes 110. The request is directed to another one of the IO sequencers 116 designated as volume owner 116-Y for the given distributed virtual volume. As mentioned previously, the volume owner 116-Y is designated for a given period time such that remaining ones of the IO sequencers 116 must request access to specified regions of the distributed virtual volume from the designated volume owner 116-Y during that period of time. The volume owner 116-Y is assumed to be on one of the storage nodes 114-Y that is actively handling IO operations directed to the distributed virtual volume for at least one of the host devices 104.

In response to the request from requester 116-X, the volume owner 116-Y generates a reply that grants a lock on the specified region of the distributed virtual volume to requester 116-X for a certain period of time. The requester 116-X is the only one of the IO sequencers permitted to process IO operations directed to the specified region of the distributed virtual volume while the lock remains in place. Accordingly, while the lock is in place, the requester 116-X processes IO operations, illustratively through an array management function (AMF) device controlling the specified region of the distributed virtual volume. The requester 116-X subsequently releases the lock by sending a release message back to the volume owner 116-Y.

In this embodiment, the distributed IO sequencer formed by cooperative interaction of the IO sequencers 116 implements a distributed locking protocol. A separate instance of the distributed IO sequencer is utilized for each of the distributed virtual volumes 110. Each instance manages its locks through a dynamically-selected lock coordinator in the form of the above-described volume owner. The designated volume owner is on a storage node 114 that is actively participating in IO processing for the corresponding distributed virtual volume. When a given one of the storage nodes 114 wants to process an IO operation directed to a specified region of the distributed virtual volume, its corresponding IO sequencer 116 must first generate a request to the volume owner and be granted the lock on that specified region. The lock is held by the requester 116-X while its corresponding node is processing IO operations through to the underlying storage arrays 106, and is then released.

It should be noted that the lock granularity may be different than the granularity of the IO operations being processed, where "granularity" refers to the smallest size region that can be designated. For example, in some embodiments utilizing Small Computer Systems Interface (SCSI) protocols to access the storage arrays 106, the SCSI IO granularity may be 512B, while the lock granularity is 4KiB or 4096B. As a result, it may sometimes be necessary to lock a larger region than is strictly necessary to process an IO request. Embodiments with mismatch of this type between lock and IO granularities are susceptible to "false sharing" conditions, where two or more storage nodes 114 are contending for the same lock despite the fact that their IO requests may be strictly non-overlapping. Other embodiments can be configured to utilize the same granularity for locks and IO operations in order to avoid mismatch and its associated potential for false sharing conditions.

As there can be overlap in lock requests and dependencies between requests, the volume owner implements mechanisms to order contending requests in a fair manner to avoid starvation and to avoid or break deadlocks. For example, when a given requester sends multiple lock requests for to the volume owner, that requestor can be granted available locks in ascending order from lowest block address to highest block address, until it contends with another requestor already holding one of the requested locks ("current lock holder"). In that case, the given requester will hold onto the locks that it has already been granted for fairness, and will also queue in first-in first-out (FIFO) order behind any other requesters already waiting for locks ("lock waiters"). This combination of holding locks and waiting in FIFO order avoids starvation. When a current lock holder releases the lock, the release will wake the oldest lock waiter which will proceed with claiming more of its requested locks.

It was mentioned previously that some embodiments address distributed virtual volumes from block 0 upwards to block n−1, where n is the size of the distributed virtual volume. Since infinitely-sized distributed virtual volumes are not possible, any requester that is waiting for a contended lock is guaranteed to avoid deadlock because through any chain of potential lock dependencies, there is a guarantee that the chain will end with a current lock holder that cannot be contending for a lock. For example, the current lock holder for block n−1 cannot be contending for a lock because the lock for block n−1 that is the last possible lock in the ascending order in which locks are granted.

Figure 4:
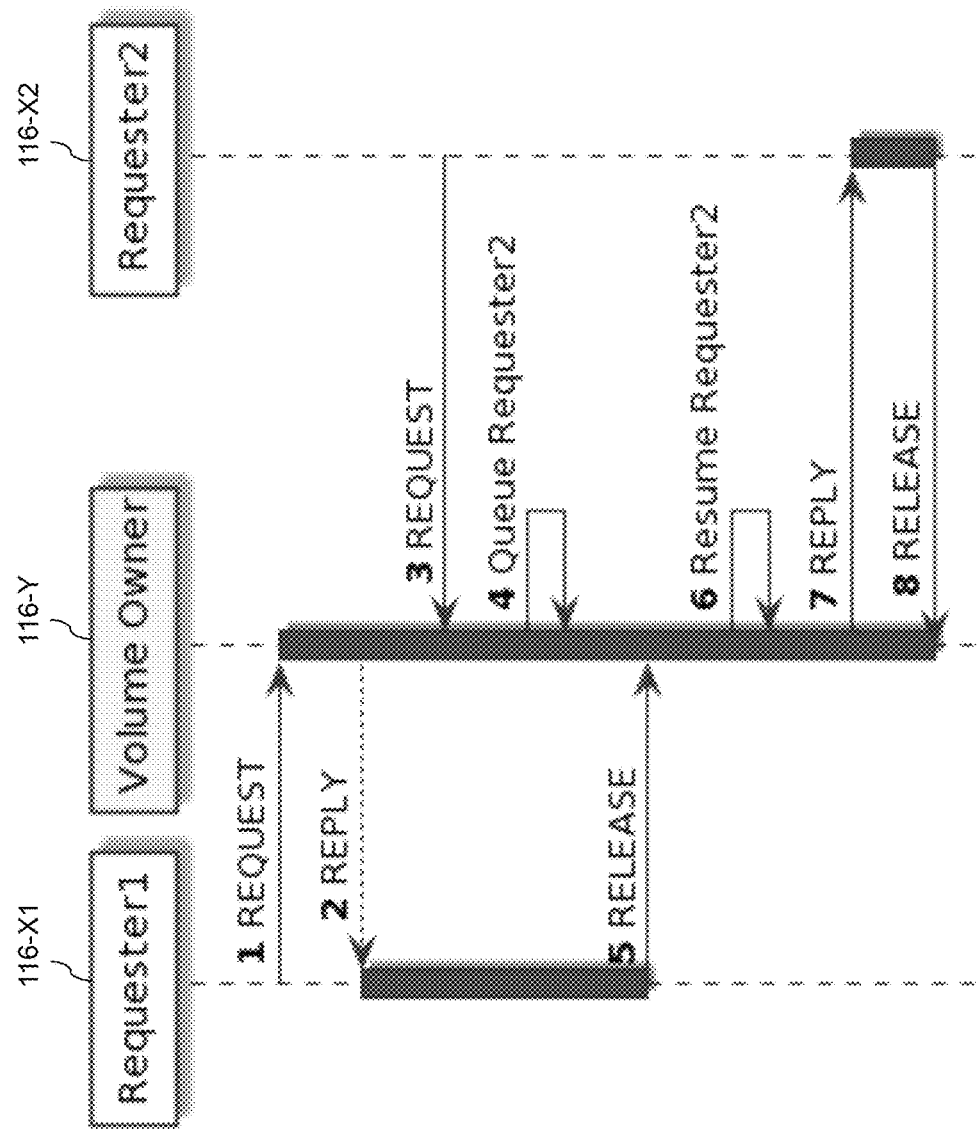

FIG. 4 illustrates an embodiment in which volume owner 116-Y receives requests for a lock on the same specified region of the distributed virtual volume from two different requesters 116-X1 and 116-X2, also denoted Requester1 and Requester2, respectively. The lock on the specified region is initially granted to requester 116-X1, and while that requester is holding the lock, the other request for the lock arrives at the volume owner 116-Y from the second requester 116-X2 as shown. The second requester 116-X2 is therefore queued in a FIFO queue as previously described until such time as the first requester 116-X1 releases the lock. At that point, the volume owner 116-Y resumes the second requester 116-X2 from the FIFO queue and grants the lock to that requestor as shown. The second requester 116-X2 subsequently releases the lock after processing its IO operations directed to the corresponding specified region of the distributed virtual volume.

Figure 5:
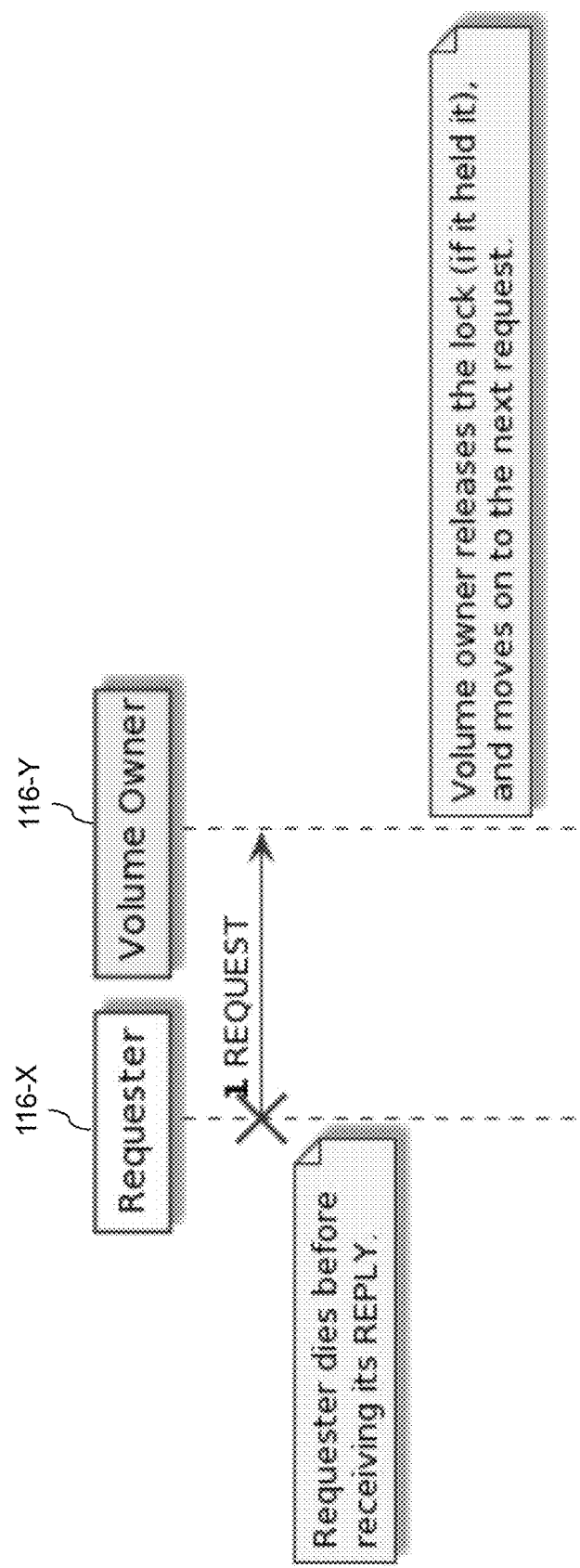

FIG. 5 illustrates a situation in which the requester 116-X fails ("dies") before receiving a reply from the volume owner 116-Y. In this situation, the volume owner 116-Y releases the lock if the lock was held by the requester 116-X, and then moves on to process the next request for that lock. More generally, responsive to a failure in one of the storage nodes 114 corresponding to a particular one of the IO sequencers 116 for which one or more locks have been granted by the volume owner 116-Y, the volume owner automatically releases any such locks granted to that IO sequencer.

Figure 6:
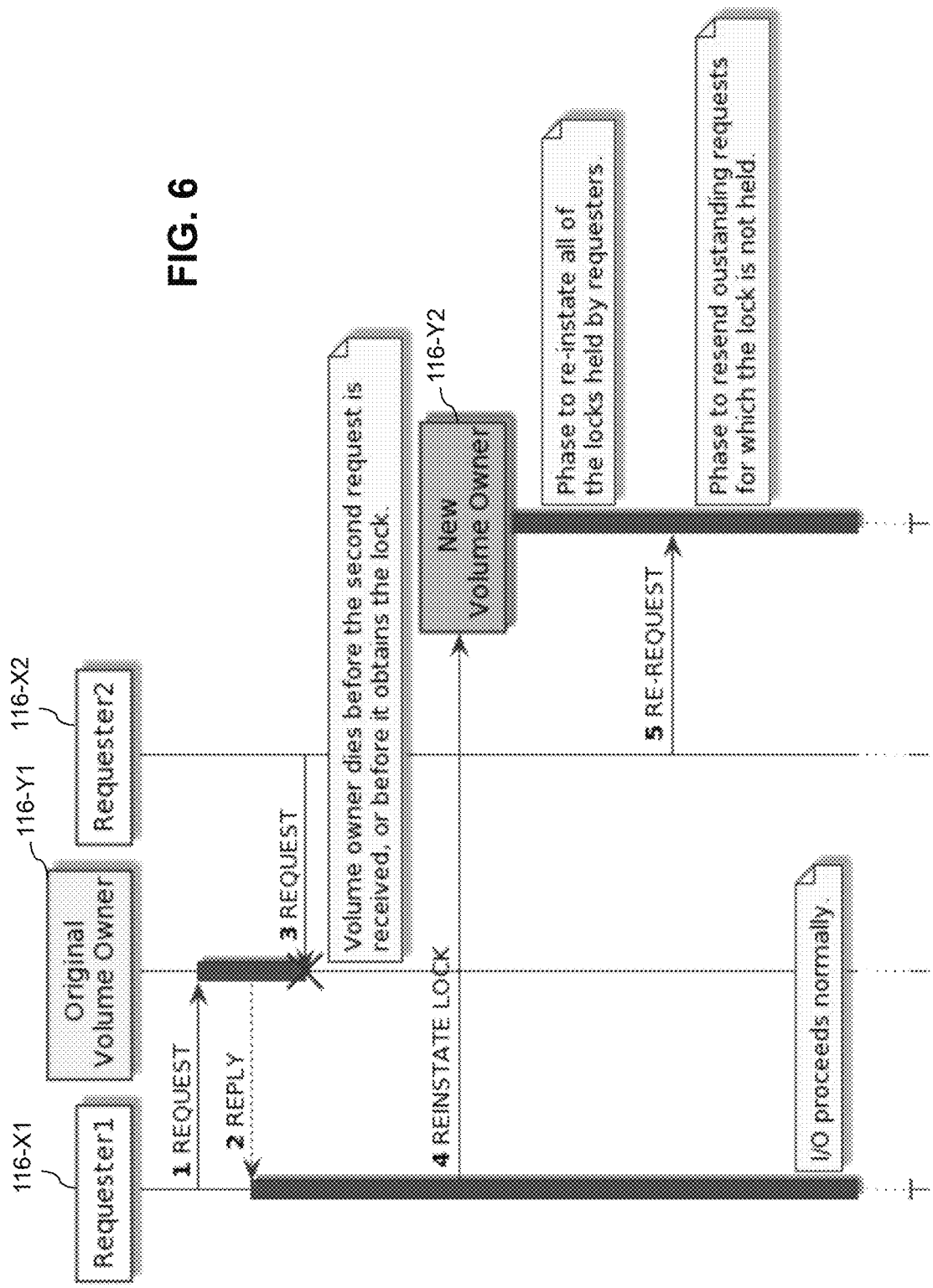

FIG. 6 illustrates a situation in which an original volume owner 116-Y1 dies before the second request from the requester 116-X2 is received, or before the requester 116-X2 can obtain the lock. In this situation, the first requester 116-X1 reinstates the lock with a new volume owner 116-Y2, which similarly reinstates any other locks held by the first requester 116-X1 and any other requesters. This is illustratively performed as part of a lock reinstatement phase in which the new volume owner 116-Y2 reconstructs all active lock and queued request state information from information that it receives from the other IO sequencers 116. Other requesters such as requester 116-X2 for which the reinstated lock is not held generate a re-request for that lock as indicated in the figure. This is illustratively performed as part of a phase to resend outstanding requests for which the lock is not held.

In the FIG. 6 embodiment, the particular IO sequencer 116 that is designated as volume owner is changed responsive to a failure in its corresponding one of the storage nodes 114. The new volume owner is selected from among the remaining IO sequencers 116. Numerous other conditions can lead to a change in the volume owner designation. For example, the volume owner designation may be changed responsive to an addition of one or more new storage nodes to the existing storage nodes 114 of the storage system.

In some embodiments, the distributed IO sequencer collectively formed by the IO sequencers 116 maintains IO statistics for the distributed virtual volume and the volume owner is changed based at least in part on the IO statistics. For example, the particular IO sequencer that is designated as volume owner for the given period of time may be the IO sequencer handling a highest volume of IO for the distributed virtual volume among all of the IO sequencers 116 for a corresponding monitoring interval. The volume owner designation can therefore vary over time based on variations in the IO statistics.

This type of arrangement is also referred to herein as dynamic locality-conscious volume owner migration. Such migration illustratively ensures continued protocol efficiency under changing IO workloads. The distributed IO sequencer formed by cooperative interaction of the IO sequencers 116 of the storage nodes 114 may be configured to record the IO statistics indicating which of the storage nodes 114 and which of the sites 102A and 102B are most actively performing IO operations to a given distributed virtual volume. The IO statistics are similarly maintained for each of the other distributed virtual volumes 110.

If an IO workload moves, such that the bulk of the workload targets a different site or storage node than that of the current volume owner, the volume owner is automatically migrated by the distributed IO sequencer so as to optimize locality of access. The migration may be implemented using a MOVE protocol that serializes and transfers the active lock and waiter state from a current volume owner to a new volume owner. Any lock request or release messages that arrive at a previous volume owner after migration to a new volume owner will be forwarded by the previous volume owner to the new volume owner, and requesters will be informed in one or more corresponding responses about the location of the new volume owner. Such an arrangement advantageously minimizes the number of inter-node and inter-site messages involved in maintaining an IO processing sequence.

Figure 7:
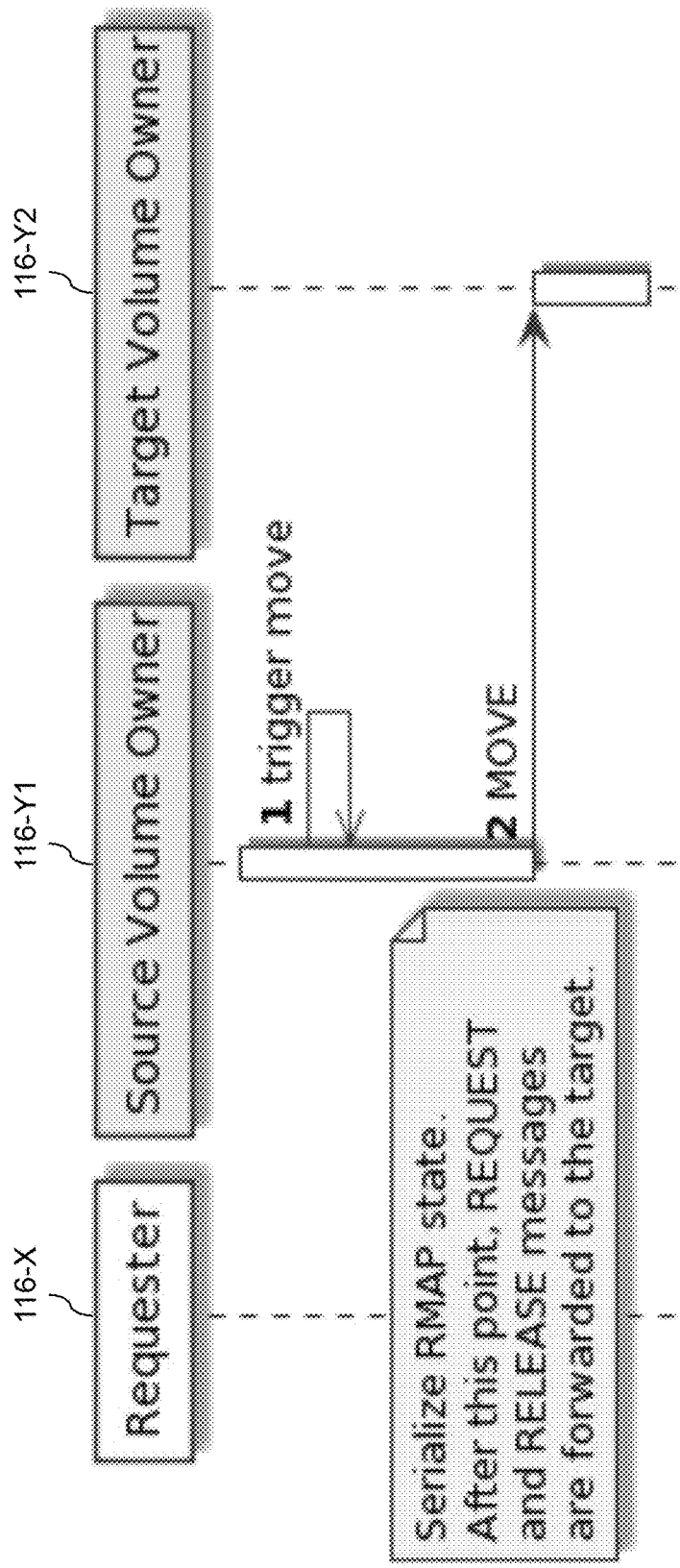

FIG. 7 shows an example of inter-node signaling associated with volume owner migration in an illustrative embodiment. In this embodiment, a source volume owner 116-Y1 triggers a move to a target volume owner 116-Y2 based at least in part on IO statistics or other locality factors. In conjunction with the move, all active lock and queued request state information is serialized and transferred from the source volume owner 116-Y1 to the target volume owner 116-Y2. The state information is also referred to in the context of this embodiment as Range Map ("RMAP") state. Any requests for access to specified regions of the distributed virtual volume arriving at the source volume owner 116-Y1 after the change are forwarded by the source volume owner 116-Y1 to the target volume owner 116-Y2 and the target volume owner 116-Y2 is identified to the requesting IO sequencers such as requester 116-X.

The RMAP state information in this embodiment illustratively comprises metadata stored at a given volume owner. For example, the RMAP state information may comprise locks stored as ranges each comprising a start block and a count of blocks within the distributed virtual volume. These ranges are stored utilizing a range map data structure that makes it efficient to look up the lock status of any given block in the distributed virtual volume. In the FIG. 7 embodiment, serialization of the state information at the source volume owner 116-Y1 illustratively comprises scanning through each of the lock regions in the range map and serializing them into a list to send to the target volume owner 116-Y2.

Figure 8:
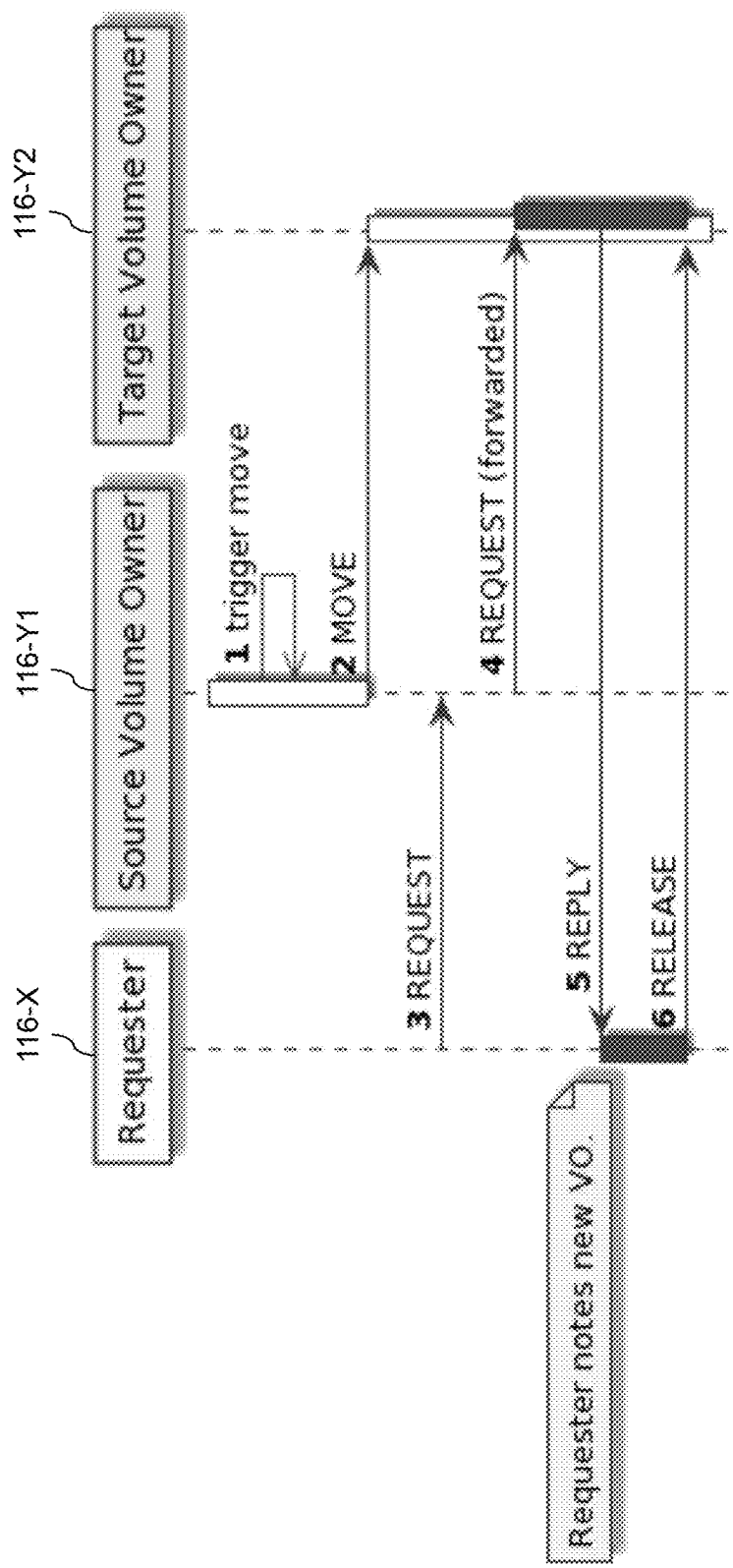

Turning now to FIG. 8, further inter-node signaling associated with a migration from source volume owner 116-Y1 to target volume owner 116-Y2 is shown. The first two steps are the same as those of FIG. 7. However, in this embodiment, after the volume owner migration, requester 116-X generates a request to the source volume owner 116-Y1. That request is forwarded by the source volume owner 116-Y1 to the target volume owner 116-Y2 as illustrated. The target volume owner 116-Y2 then generates a reply back to the requester 116-X, and the requester 116-X notes the new volume owner. After being granted the requested lock in a reply from the target volume owner 116-Y2, the requester processes IO operations for a period of time, and subsequently releases the lock by sending a corresponding release message back to the target volume owner 116-Y2.

Figure 9:
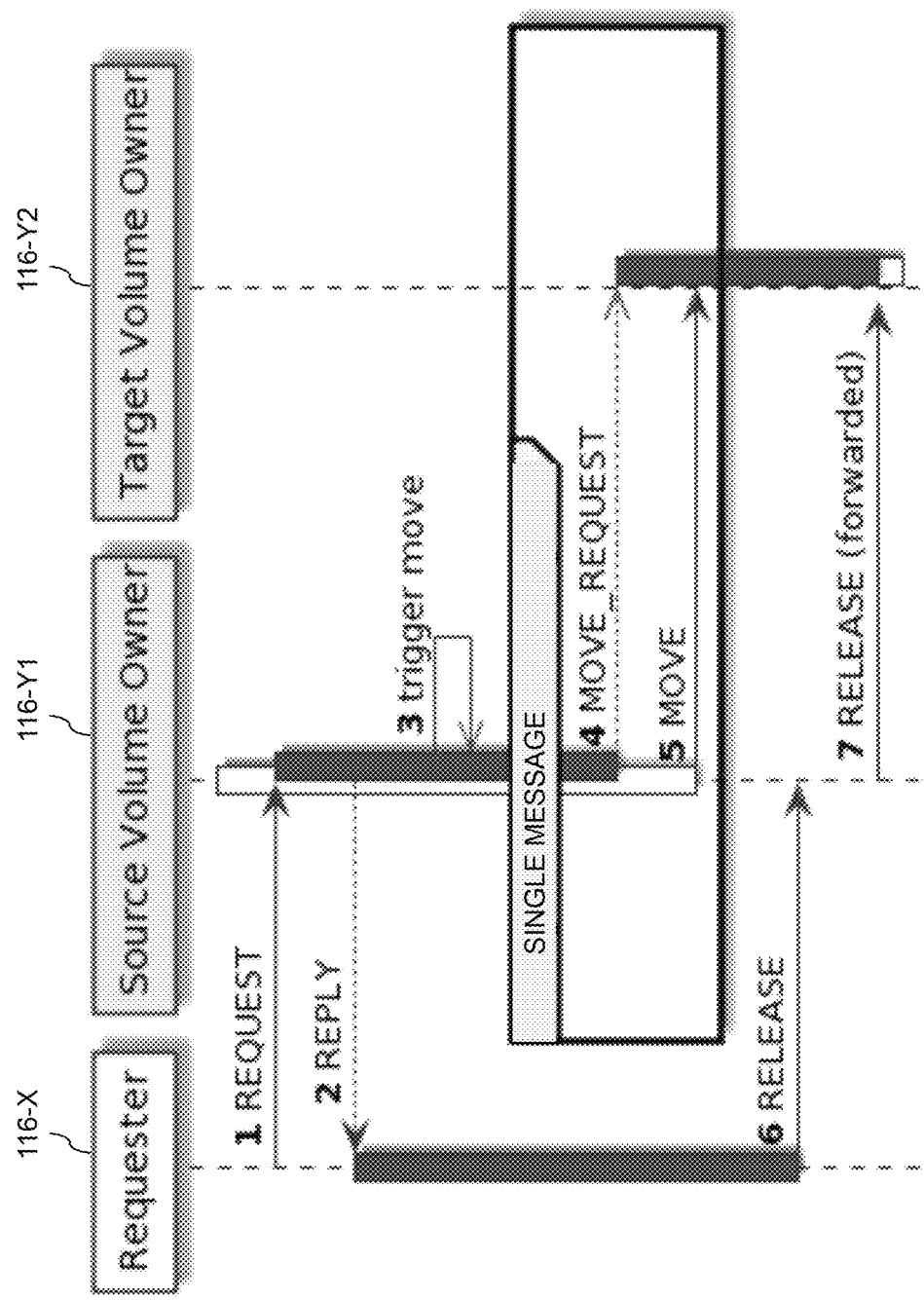

FIG. 9 illustrates a situation in which requester 116-X has already requested and been granted the lock and is actively processing IO operations to the corresponding specified region of the distributed virtual volume when the migration from source volume owner 116-Y1 to target volume owner 116-Y2 is triggered. In this situation, the migration occurs with move signaling as shown, illustratively using a single message transmitted from the source volume owner 116-Y1 to the target volume owner 116-Y2, although other types of message formats and inter-node signaling can be used in other embodiments. The single message is illustratively generated using a reliable ordered messaging layer, configured to implement an inter-node communication protocol that guarantees reliable ordered messaging. In this embodiment, the requester 116-X completes its IO operations to the specified region for which it holds the lock, and sends a release message back the source volume owner 116-Y1. The source volume owner 116-Y1 then forwards the release message to the target volume owner 116-Y2.

In some embodiments, the distributed IO sequencer is formed at least in part by executing distributed virtually-synchronous broadcast protocols to identify a set of nodes across the first and second sites that will participate in distributed IO sequencing for a given one of the distributed virtual volumes 110. For example, at major system lifecycle events such as storage node failures or new storage node arrivals, a distributed virtually-synchronous broadcast protocol can be executed among the storage nodes to identify the set of storage nodes 114 whose respective IO sequencers 116 will collectively form the distributed IO sequencer, and to determine which of those particular IO sequencers 116 should be designated as the current volume owner for the distributed virtual volume.

The designated volume owners for respective ones of the distributed virtual volumes 110 can initially be load balanced across the IO sequencers 116 of the storage nodes 114 in order to minimize hotspots. Such an arrangement can be used in the absence of any access locality knowledge at the time of initial configuration of the distributed virtual volumes 110. The IO sequencers 116 of the storage nodes 114 are informed of the volume owner designations for the respective distributed virtual volumes 110.

If a given one of the volume owners is subsequently migrated due to changes in workload locality, the other IO sequencers do not need to learn about it right away. Instead, the other IO sequencers can learn about a volume owner migration in an on-demand manner when they try to send lock request or lock release messages to the old volume owner and those messages are forward to the new volume owner. For example, requesters can infer the new volume owner by identifying the volume owner that sends back a reply to the request or release message, such that no additional communication is needed between the requester and the new volume owner to allow the requester to identify the new volume owner.

It is possible that different requesters may disagree regarding which of the IO sequencers is currently designated as the volume owner. However, any such requester is guaranteed to find a route to the actual current volume owner, and can lazily update such information in a memory of the corresponding storage node. In order for the route to be deterministic and to avoid loops, and to ensure that concurrent requests generated during volume owner migration result in consistent and up-to-date state information, messages sent through the distributed IO sequencer are assigned generation numbers.

As indicated previously, these embodiments are also illustratively configured to implement failure handling functionality so as to avoid undesirable draining of IO operations. Such storage node failures can affect lock requesters as well as the volume owner for a given distributed virtual volume.

When an IO requestor dies, as in the illustrative embodiment previously described in conjunction with FIG. 5, the connection between the corresponding storage node and the host device for which the IO request was generated is disrupted. The host device will treat the IO operation as a failure and will retry the IO operation. The distributed IO sequencer is therefore configured to release all of the locks held by the IO requester that has died. The retried IO operation will then be correctly handled by another storage node comprising an IO sequencer that will generate a lock request.

When a volume owner dies, as in the illustrative embodiment previously described in conjunction with FIG. 6, the distributed IO sequencer selects a new volume owner from among the remaining IO sequencers that are currently processing IO operations for the given distributed virtual volume. The lock state previously maintained by the failed volume owner has been lost, but is reconstructed by the remaining IO sequencers based on their knowledge of the locks currently granted within the system. For example, each of the IO sequencers can send its list of held locks and its list of requested but not yet granted locks to the new volume owner. The new volume owner utilizes this information to reconstruct all active lock and queued request state information so as to permit all in-process IO operations to complete without draining. This drain-free approach allows failure recovery to be completed quickly and with less disruption to IO operations.

The particular inter-node signaling arrangements, message formats and other distributed IO sequencing functionality described above in conjunction with the particular cacheless mode of operation illustrated in the diagrams of FIGS. 3 through 9 is presented by way of example only, and should not be construed as limiting in any way. Additional or alternative signaling arrangements and associated message formats may be used to implement cacheless modes of operation in other embodiments.

Illustrative embodiments of storage systems with selectable cached and cacheless modes of operation for handling IO operations in conjunction with distributed storage virtualization as disclosed herein can provide a number of significant advantages relative to conventional arrangements.

For example, some embodiments advantageously provide active-active storage arrangements across multi-site storage systems in a particularly efficient and flexible manner. Such embodiments are configured to provide independent selectability between cached and cacheless modes of operations on a per-volume basis for multiple distributed virtual volumes of a multi-site storage system.

Illustrative embodiments can therefore provide significant advantages over arrangements involving exclusive use of a cached mode of operation only, while also reducing the size of potentially costly caches in the storage nodes.

A cacheless mode of operation utilizing distributed IO sequencing as disclosed herein can provide substantial aggregate IO performance improvements in terms of increased IO throughput and reduced latency. Moreover, the IO performance in the cacheless mode of operation in illustrative embodiments is very stable and predictable with respect to the underlying storage arrays of the one or more storage system sites.

Additionally or alternatively, some embodiments provide a selectable cacheless mode of operation with effective locality-conscious optimizations that minimize protocol communication overhead.

Some embodiments provide a selectable cacheless mode of operation with a failure handling mechanism that recovers IO ordering without suspending and draining host device IO operations. For example, responsive to a failure in one of the storage nodes corresponding to the particular IO sequencer currently designated as volume owner, a new volume owner is selected from among the remaining IO sequencers. The new volume owner reconstructs all active lock and queued request state information utilizing information that it receives from the other IO sequencers. This advantageously allows all in-process IO operations to complete, thereby avoiding the need to drain any IO operations responsive to the failure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage node clusters 112A and 112B, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail. Although described in the context of system 100, these platforms may also be used to implement at least portions of other information processing systems in other embodiments.

In one embodiment, a processing platform comprises cloud infrastructure including a combination of physical and virtual processing resources that may be utilized to implement at least a portion of the information processing system 100. The cloud infrastructure comprises a plurality of virtual machines implemented using a hypervisor. The hypervisor runs on physical infrastructure. The cloud infrastructure further comprises sets of applications running on respective ones of the virtual machines under the control of the hypervisor. The cloud infrastructure may in some cases comprise multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement the above-noted hypervisor and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure described above may represent at least a portion of one processing platform.

Another example of such a processing platform is a processing platform that includes a plurality of processing devices configured to communicate with one another over a network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

A given processing device in the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the given processing device is network interface circuitry, which is used to interface the processing device with the network and other system components, and may comprise conventional transceivers.

The other processing devices of the processing platform are assumed to be configured in a manner similar to that described above for the given processing device.

Again, the particular processing platforms described above are presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the distributed storage controller 105, such as the IO sequencers 116, cache controller 118 and mode select modules 120, are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, single or multiple sites, host devices, storage systems, virtual volumes, storage nodes, storage arrays, storage devices, storage controllers, IO sequencers, cache controllers and mode select modules. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage nodes each associated with one or more storage devices;
the storage system being configured to provide at least one virtual volume distributed over the storage nodes for utilization by a plurality of host devices;
the storage nodes being configured to support selection between multiple operating modes for handling input-output operations directed to the distributed virtual volume by the host devices, the multiple operating modes comprising at least:
a cached mode of operation in which consistency across the storage nodes for the distributed virtual volume when accessed by different ones of the host devices is ensured utilizing a distributed cache coherence protocol implemented by cooperative interaction of cache controllers of respective ones of the storage nodes; and
a cacheless mode of operation in which consistency across the storage nodes for the distributed virtual volume when accessed by different ones of the host devices is ensured without utilizing the distributed cache coherence protocol and its associated cache controllers of the respective storage nodes.

2. The apparatus of claim 1 wherein the storage system comprises a multi-site storage system and the plurality of storage nodes comprise at least a first storage node cluster at a first site and a second storage node cluster at a second site and further wherein each of the first and second storage clusters provides access to at least one storage array comprising a plurality of storage devices at the corresponding site.

3. The apparatus of claim 2 wherein the distributed virtual volume comprises at least one logical unit of the storage system that is mirrored from the first site to the second site so as to permit active-active access to said at least one logical unit from one or more host devices at both the first site and the second site.

4. The apparatus of claim 1 wherein the cacheless mode of operation is configured to ensure consistency across the storage nodes for the distributed virtual volume when accessed by different ones of the host devices through utilization of a distributed input-output sequencer implemented by cooperative interaction of input-output sequencers of respective ones of the storage nodes.

5. The apparatus of claim 4 wherein a particular one of the input-output sequencers is designated as volume owner of the distributed virtual volume for a given period of time and remaining ones of the input-output sequencers must request access to specified regions of the distributed virtual volume from the designated volume owner during that period of time.

6. The apparatus of claim 5 wherein the volume owner is configured to grant a lock on a specified region of the distributed virtual volume to a given one of the remaining input-output sequencers responsive to a corresponding request from that input-output sequencer and wherein the given input-output sequencer is the only one of the input-output sequencers permitted to process input-output operations directed to the specified region of the distributed virtual volume while the lock remains in place.

7. The apparatus of claim 5 wherein responsive to a failure in one of the storage nodes corresponding to the particular input-output sequencer currently designated as volume owner, a new volume owner is selected from among the remaining input-output sequencers, and wherein the new volume owner reconstructs all active lock and queued request state information from information that it receives from the other input-output sequencers so as to permit all in-process input-output operations to complete.

8. The apparatus of claim 1 wherein the storage system is configured to provide a plurality of virtual volumes distributed over the storage nodes for utilization by the plurality of host devices and wherein selection between the cached mode of operation and the cacheless mode of operation is made independently for each of at least a subset of the distributed virtual volumes, such that at least one of the distributed virtual volumes operates in the cached mode of operation simultaneously with one or more other ones of the distributed virtual volumes operating in the cacheless mode of operation.

9. The apparatus of claim 8 wherein information specifying which of the cached operating mode and the cacheless operating mode is to be utilized for a given one of the distributed virtual volumes is stored as part of a set of metadata maintained for the given distributed virtual volume.

10. The apparatus of claim 8 wherein a given one of the distributed virtual volumes operating in the cached mode of operation is controllably transitioned to the cacheless mode of operation based at least in part on one or more cache utilization statistics that are maintained for the given distributed virtual volume in the cached mode of operation falling below one or more specified threshold levels.

11. The apparatus of claim 10 wherein the cache utilization statistics comprise at least one of a percentage of input-output operations directed to the given distributed virtual volume that benefit from operation in the cached mode of operation and a latency reduction experienced by input-output operations directed to the given distributed virtual volume when operating in the cached mode of operation.

12. The apparatus of claim 1 wherein selection between the cached mode of operation and the cacheless mode of operation is made dynamically at run-time for the distributed virtual volume via an application programming interface exposed by the storage system to one or more of the host devices and without disruption of any input-output operations directed to the distributed virtual volume by one or more of the host devices.

13. The apparatus of claim 1 wherein in conjunction with a transition from one of the cached and cacheless modes of operation to the other of the cached and cacheless modes of operation for the distributed virtual volume, the cached and cacheless modes of operation for processing input-output operations directed to the distributed virtual volume are concurrently executed in a stacked configuration relative to one another until such time as a complete switch from one of the modes of operation to the other can be made without disruption of input-output operations, and further wherein if the transition is from the cached mode of operation to the cacheless mode of operation, cached input-output data is evicted prior to switching from the cached mode of operation to the cacheless mode of operation.

14. The apparatus of claim 1 wherein in conjunction with a transition from one of the cached and cacheless modes of operation to the other of the cached and cacheless modes of operation for the distributed virtual volume, input-output operations directed to the distributed virtual volume are temporarily suspended for a period of time sufficient to complete any in-process input-output operations, and further wherein if the transition is from the cached mode of operation to the cacheless mode of operation, cached input-output data is evicted prior to switching the input-output operations from a cached input-output path to a cacheless input-output path arranged in parallel with the cached input-output path.

15. A method comprising:
configuring a storage system to comprise a plurality of storage nodes each associated with one or more storage devices;
providing at least one virtual volume distributed over the storage nodes for utilization by a plurality of host devices; and
selecting between multiple operating modes supported by the storage system for handling input-output operations directed to the distributed virtual volume by the host devices, the multiple operating modes comprising at least:
a cached mode of operation in which consistency across the storage nodes for the distributed virtual volume when accessed by different ones of the host devices is ensured utilizing a distributed cache coherence protocol implemented by cooperative interaction of cache controllers of respective ones of the storage nodes; and
a cacheless mode of operation in which consistency across the storage nodes for the distributed virtual volume when accessed by different ones of the host devices is ensured without utilizing the distributed cache coherence protocol and its associated cache controllers of the respective storage nodes.

16. The method of claim 15 wherein the cacheless mode of operation is configured to ensure consistency across the storage nodes for the distributed virtual volume when accessed by different ones of the host devices through utilization of a distributed input-output sequencer implemented by cooperative interaction of input-output sequencers of respective ones of the storage nodes.

17. The method of claim 15 wherein the storage system is configured to provide a plurality of virtual volumes distributed over the storage nodes for utilization by the plurality of host devices and wherein selection between the cached mode of operation and the cacheless mode of operation is made independently for each of at least a subset of the distributed virtual volumes, such that at least one of the distributed virtual volumes operates in the cached mode of operation simultaneously with one or more other ones of the distributed virtual volumes operating in the cacheless mode of operation.

18. A computer program product comprising a non-transitory processor-readable storage medium having stored therein program code of one or more software programs, wherein the program code when executed by a storage system comprising a plurality of storage nodes each associated with one or more storage devices causes the storage system:
to provide at least one virtual volume distributed over the storage nodes for utilization by a plurality of host devices; and
to select between multiple operating modes supported by the storage system for handling input-output operations directed to the distributed virtual volume by the host devices, the multiple operating modes comprising at least:
a cached mode of operation in which consistency across the storage nodes for the distributed virtual volume when accessed by different ones of the host devices is ensured utilizing a distributed cache coherence protocol implemented by cooperative interaction of cache controllers of respective ones of the storage nodes; and
a cacheless mode of operation in which consistency across the storage nodes for the distributed virtual volume when accessed by different ones of the host devices is ensured without utilizing the distributed cache coherence protocol and its associated cache controllers of the respective storage nodes.

19. The computer program product of claim 18 wherein the cacheless mode of operation is configured to ensure consistency across the storage nodes for the distributed virtual volume when accessed by different ones of the host devices through utilization of a distributed input-output sequencer implemented by cooperative interaction of input-output sequencers of respective ones of the storage nodes.

20. The computer program product of claim 18 wherein the storage system is configured to provide a plurality of virtual volumes distributed over the storage nodes for utilization by the plurality of host devices and wherein selection between the cached mode of operation and the cacheless mode of operation is made independently for each of at least a subset of the distributed virtual volumes, such that at least one of the distributed virtual volumes operates in the cached mode of operation simultaneously with one or more other ones of the distributed virtual volumes operating in the cacheless mode of operation.

* * * * *